United States Patent
Baker et al.

[15] 3,691,164
[45] Sept. 12, 1972

[54] PRODUCTION IMPROVEMENT FOR SUBSTITUTED TRIAZINES

[72] Inventors: Ronald Baker; Thomas Kirkly Storer, both of Blackley, Manchester, England

[73] Assignee: Imperial Chemical Industries Limited, London, England

[22] Filed: Aug. 24, 1970

[21] Appl. No.: 66,579

[30] Foreign Application Priority Data

Nov. 20, 1969 Great Britain.......56,850/69

[52] U.S. Cl.............................................260/249.8
[51] Int. Cl.................................................C07d 55/46
[58] Field of Search...................................260/249.8

[56] References Cited

UNITED STATES PATENTS 2,393,755  1/1946  D'Alelio..............260/249.8 X
3,235,359  2/1966  Acker..................260/249.8 X Primary Examiner—John M. Ford
Attorney—Cushman, Darby & Cushman

[57] ABSTRACT

In the manufacture of the dyestuff intermediates of U.K. Pat. specification No. 914 932 by condensing 1 mole of an alkylene diamine and 1 mole of a N-(2,4-dihalogeno-s-triazin-6-yl) sulphoaniline or sulphonaphthylamine, products of higher purity are obtained by adding a neutral solution of the latter to an aqueous solution of a mineral acid salt of an alkylene diamine, the minimum amount of the diamine being 1.2 molecular proportions of the 1,3,5,-triazine derivative, and the amount of mineral acid present being at least 1.9 molecular proportions, based on the alkylene diamine, and simultaneously adding an alkali to maintain the pH of the reaction mixture in the region of 6.5–7. A reaction temperature of 30° C. to 35° C is preferred.

Alternatively, instead of adding alkali, 1-2moles of an alkali metal bicarbonate are added to the mineral acid solution of the alkylene diamine before starting to add the s-triazine compound.

5 Claims, No Drawings

PRODUCTION IMPROVEMENT FOR SUBSTITUTED TRIAZINES

U.K. Pat. specification No. 914,932 describes and claims 2-halogen-1,3,5-triazine derivatives which contain in the 4-position of the triazine nucleus the residue of an alkylene diamine containing two primary or two secondary amino groups, and which contain in the 6-position the residue of a sulphophenyl- or sulphonaphthyl- amine bound through its amino group to the carbon atom of the triazine ring, and a process for manufacture of these derivatives by reacting an alkylene diamine containing two primary or two secondary amino groups in an aqueous medium with a water-soluble 2,4-dihalogeno- 1,3,5- triazine derivative which contains in the 6-position a sulphophenylamino or sulphonaphthylamino group.

The specification states that to obtain substantially only an alkylene diamine derivative having a single monohalogen triazine group, it is advantageous to use approximately equimolecular proportions of the diamine and the dihalogen triazine derivative and to add the diamine to an approximately neutral solution of the dihalogen triazine derivative.

It has not been found, however, that even purer monocondensation products can be obtained by a procedure differing from this stated preference.

Accordingly the present invention provides an improved process for the compounds of specification No.914,932 which comprises adding a substantially neutral aqueous solution of a water-soluble 2,4-dihalogeno-1,3,5-triazine derivative which contains in the 6-position a sulphophenylamino or sulphonaphthylamino group, to an aqueous solution of a mineral acid salt of an alkylene diamine, the minimum amount of the diamine being 1:2 molecular proportions of the 1,3,5-triazine derivative, and the amount of mineral acid present being at least 1.9 molecular proportions, based on the alkylene diamine, and simultaneously adding an alkali to maintain the pH of the reaction mixture in the region of 6.5–7. A reaction temperature of 30° to 35° C is preferred.

In a modification of this process it has also been found that a similar excellent result can be obtained if an amount of an alkali metal bicarbonate, especially sodium bicarbonate, equivalent to one to two moles, preferably 1.5 moles, of the triazine derivative is added to the mineral acid solution of the alkylene diamine before starting to add the 1,3,5-triazine derivative. In this case, it is no longer necessary to add alkali during addition of the 1,3,5-triazine derivative.

The invention is illustrated but not limited by the following Examples in which parts are by weight:

EXAMPLE 1

126.5 parts of 1-aminobenzene-2,5-disulphonic acid are stirred with 175 parts of water and sufficient ION sodium hydroxide solution is added to bring to pH 7.0. This solution is added rapidly to a stirred mixture of 97 parts of cyanuric chloride, 225 parts of water, 575 parts of ice and 2 parts of Calsolene Oil HS. The hydrochloric acid formed in the reaction is neutralized by the dropwise addition of 2N sodium carbonate solution at such a rate as to maintain the mixture at pH 6.5–7.0. The temperature is maintained 3°–5° C by the addition of further ice as required. The condensation is complete when no further hydrochloric acid is liberated and the pH remains constant without the further addition of sodium carbonate. The solution is freed from excess cyanuric chloride by filtration and retained for reaction with ethylene diamine. Preparatory to the second stage of the condensation 36 parts of ethylene diamine are dissolved in 2,000 parts of water and the solution is adjusted to pH 7.0 by the addition of 75.5 parts of hydrochloric acid S.G. 1.18; 63 parts of sodium bicarbonate are added to the mixture to give a resulting pH of 6.5. The temperature is raised to 30°–35° C and the solution of 2,4-dichloro-6-(2,5-disulphophenylamino)-s-triazine prepared as described is added during 1-2 hours. The mixture is stirred at 30°–35 C for 5 hours and is then allowed to cool to 20° C. The product is precipitated by the addition of 20 percent of sodium chloride, isolated by filtration, and washed with 750 parts of 20 percent sodium chloride solution. The aqueous paste so obtained contains 2-N-β-aminoethylamino-4-chloro-6-(2,5-disulphophenylamino)-s-triazine in approximately 90 percent of the theoretical yield.

EXAMPLE 2

Sixty parts of ethylene diamine are dissolved in 2,000 parts of water and the solution is adjusted to pH 7.0 by the addition of 126 parts of hydrochloric acid S.G. 1.18. 1,000 parts of sodium chloride representing 20 percent w/v of the final solution are added and the temperature of the mixture is raised to 30°–35° C. The mixture is stirred and a solution of 2,4-dichloro-6-(2,5-disulphophenylamino)-s-triazine prepared from 126.5 parts of 1-aminobenzene-2,5-disulphonic acid by the method described in Example 1 is added during 3 hours, the pH of the mixture being kept at 6.5–7.0 by the simultaneous addition of 2N sodium carbonate solution. Stirring is continued at 30°–35° C until no further addition of sodium carbonate is required to maintain the pH. The mixture is then allowed to cool to 20° C and the insoluble product is filtered off and washed with 750 parts of 20 percent sodium chloride solution, the cream colored aqueous paste so obtained contains 2-N-β-aminoethylamino-4-chloro-6-(2,5-disulphophenylamino)-s-triazine essentially free from the bis condensation product.

EXAMPLE 3

86.5 parts of 1-aminobenzene-3-sulphonic acid are stirred with 200 parts of water and sufficient ION sodium hydroxide solution is added to bring to pH 7.0. This solution is added dropwise to a stirred mixture of 97 parts of cyanuric chloride, 225 parts of water, 575 parts of ice and 2 parts of Calsolene Oil HS. The hydrochloric acid formed in the reaction is neutralized by the simultaneous addition of 2N sodium carbonate solution at such a rate as to maintain the mixture at pH 6.5–7.0, and the temperature is maintained at 0°–5° C by the addition of further ice. The condensation is complete when no further hydrochloric acid is liberated and the pH remains constant without the further addition of sodium carbonate. The solution is freed from the excess of cyanuric chloride by filtration. 36 parts of ethylene diamine are dissolved in 2000 parts of water and the solution is adjusted to pH 7.0 by the addition of 75.5 parts of hydrochloric acid S.G. 1.18; 63 parts of sodium bicarbonate are added to the mixture to give a resulting pH of 6.5. The temperature is raised to 30°–35° C and the above solution of 2,4-dichloro-6-(3-sulphophenylamino)-s-triazine is added during 1-2 hours. The mixture is stirred at 30°–35° C for 5 hours and is then allowed to cool to 20° C. The precipitation of the product is completed by the addition of sodium chloride and is isolated by filtration. Essentially pure 2-N-β-aminoethylamino-4-chloro-6-(3-sulphophenylamino)-s-triazine is obtained in good yield.

Analogous compounds are obtained by replacing the 1-aminobenzene-3-sulphonic acid in the above example by the equivalent quantity of 1-aminobenzene-2-sulphonic acid, 1-aminobenzene-4-sulphonic acid, 1-amino-2-carboxybenzene-4-sulphonic acid, 1-amino-2-methylbenzene-4-sulphonic acid, or of 2-aminonaphthlene-4,8-disulphonic acid.

EXAMPLE 4

126.5 parts of 1-aminobenzene-2,5-disulphonic acid are stirred with 175 parts of water and sufficient ION sodium hydroxide solution is added to bring to pH 7.0. This solution is added rapidly to a stirred mixture of 97 parts of cyanuric chloride, 225 parts of water, 575 parts of ice and 2 parts of Calsolene Oil HS. The hydrochloric acid formed in the reaction is neutralized by the dropwise addition of 2N sodium carbonate solution at such a rate as to maintain the mixture at pH 6.5–7.0. The temperature is maintained at 3°–5° C by the addition of further ice as required. The condensation is complete when no further hydrochloric acid is liberated and the pH remains constant without the further addition of sodium carbonate. The solution is freed from excess cyanuric chloride by filtration.. 44.7 parts of 1:2-propylene diamine are dissolved in 2,000 parts of water and the solution is adjusted to pH 7.0 by the addition of 75.5 parts of hydrochloric acid S.G. 1.18; 63 parts of sodium bicarbonate are added to the mixture to give a resulting pH of 6.5. The temperature is raised to 30°–35° C and the above solution of 2,4-dichloro-6-(2,5-disulphophenylamino)-s-triazine is added during 1-2hours. The mixture is stirred at 30°–35° C for 5 hours and is then allowed to cool to 20° C. The product is precipitated by the addition of 20 percent of sodium chloride, isolated by filtration, and washed with 20 percent sodium chloride solution. The product obtained is virtually free from bis condensed material.

What we claim is:

1. An improved process for the manufacture of 2-halogen-1,3,5-triazine derivaties which contain in the 4-position of the triazine nucleus the residue of an alkylene diamine containing two primary or two secondary amino groups, and which contain in the 6- position the residue of a sulphophenyl- or sulphonaphthylamine bound through its amino group to the carbon atom of the triazine ring, which comprises adding a substantially neutral aqueous solution of a water-soluble 2,4-dihalogeno-1,3,5triazine derivative which contains in the 6-position a sulphophenylamino or sulphonaphthylamino group, to an aqueous solution of a mineral acid salt of an alkylene diamine, the minimum amount of the diamine being 1. 2 molecular proportions of the 1,3,5-triazine derivative, and the amount of mineral acid present being at least 1.9 molecular proportions, based on the alkylene diamine, and simultaneously adding an alkali to maintain the pH of the reaction mixture in the region of 6.5–7.

2. A process as claimed in claim 1 in which the reaction is carried out at a temperature of 30°–35° C.

3. A modification of the process claimed in claim 1 wherein, instead of adding alkali, an amount of an alkali metal bicarbonate equivalent to one to two moles of the triazine derivative is added to the mineral acid solution of the alkylene diamine before starting to add the triazine derivative.

4. A process as claimed in claim 3 wherein the amount of alkali metal bicarbonate is 1.5 moles, based on the triazine derivative.

5. A process as claimed in claim 3 wherein the alkali metal bicarbonate is sodium bicarbonate.

* * * * *